United States Patent [19]

Miller

[11] Patent Number: 4,892,664
[45] Date of Patent: Jan. 9, 1990

[54] DECONTAMINATION OF SITES WHERE ORGANIC COMPOUND CONTAMINANTS ENDANGER THE WATER SUPPLY

[75] Inventor: Paul C. Miller, Pitman, N.J.

[73] Assignee: Groundwater Technology, Inc., Norwood, Mass.

[21] Appl. No.: 78,779

[22] Filed: Jul. 28, 1987

[51] Int. Cl.$^4$ .................................................. C02F 1/20
[52] U.S. Cl. ........................................ 210/747; 55/46; 55/53; 55/183; 55/196; 166/75.1; 166/267; 203/10; 210/750; 210/763; 210/766; 210/181; 210/170; 210/188; 422/173; 422/177
[58] Field of Search ................... 166/75.1, 267; 55/46, 55/51, 53, 183, 196; 210/750, 758, 763, 765, 766, 181, 188, 747, 170; 203/10; 422/173, 177; 423/230, 239

[56] References Cited

U.S. PATENT DOCUMENTS

| | | | |
|---|---|---|---|
| 2,690,425 | 9/1954 | Moses et al. | 210/762 |
| 2,872,415 | 2/1959 | Schleyer et al. | 210/750 |
| 2,940,835 | 6/1960 | Scofield | 422/177 |
| 2,944,396 | 7/1960 | Barton et al. | 210/763 |
| 3,013,628 | 12/1961 | Jacobs et al. | 422/173 |
| 3,029,202 | 4/1962 | Brown | 210/763 |
| 3,442,802 | 5/1969 | Hamilton et al. | 210/763 |
| 3,475,282 | 10/1969 | Hamilton | 203/49 |
| 3,690,840 | 9/1972 | Volker | 422/173 |
| 3,804,756 | 4/1974 | Callahan et al. | 210/763 |
| 3,867,287 | 2/1975 | Jakob | 210/750 |
| 3,898,058 | 8/1975 | McGill | 55/53 |
| 3,912,598 | 10/1975 | Dick | 202/185 |
| 3,931,390 | 1/1976 | Palilla et al. | 423/244 |
| 3,984,311 | 10/1976 | Diesen et al. | 210/763 |
| 3,997,303 | 12/1976 | Newton | 55/185 |
| 4,018,568 | 4/1977 | Brewer | 210/763 |
| 4,048,007 | 9/1977 | Valle-Riestra | 55/53 |
| 4,167,973 | 9/1979 | Forte et al. | 210/750 |
| 4,330,513 | 5/1982 | Hunter et al. | 422/177 |
| 4,526,692 | 7/1985 | Yohe et al. | 210/747 |
| 4,593,760 | 6/1986 | Visser et al. | 166/267 |
| 4,600,508 | 7/1986 | DeGhetto | 210/170 |
| 4,611,950 | 9/1986 | Russomano | 405/128 |
| 4,730,672 | 3/1988 | Payne | 166/267 |

FOREIGN PATENT DOCUMENTS 2035814  6/1980  United Kingdom .................... 55/53

OTHER PUBLICATIONS

Exothermics-Eclipse Literature.
Johnson Matthery Chemicals Ltd. literature.
"Cost Model for Selected Technologies for Removal of Gasoline Components from Groundwater", Health and Environmental Sciences Department, API Publication No. 4422 dated Feb. 1986.
"ARI's Econ-Abator fluidized bed catalytic incinerator system provides energy saving, low cost air pollution control.", Product Literature.

Primary Examiner—Peter Hruskoci

[57] ABSTRACT

A method and system for decontaminating water, e.g., groundwater or process effluent, which is contaminated by small concentrations, e.g., in the range of 0.01 to 100 ppm, of dissolved volatile organic compounds (VOCs) includes introducing a flow of the water to an air stripping stage in which the water is directed through a packed column and air is directed through the column to air-strip organic molecules from the contaminated water; releasing the thus decontaminated water substantially free of the compounds to the environment; pretreating the organic compounds-carrying air in the substantial absence of water particles by a preheater; passing the heated air through a catalytic stage that oxidizes the organic compounds, and releasing the gaseous effluent from the catalytic stage to the atmosphere substantially free of organic contaminants. A system for decontaminating water contaminated by small concentrations of dissolved volatile organic compounds is also described, which includes apparatus for retrofitting an existing air stripper for this purpose.

10 Claims, 3 Drawing Sheets

DECONTAMINATION OF SITES WHERE ORGANIC COMPOUND CONTAMINANTS ENDANGER THE WATER SUPPLY

The invention relates to a method and apparatus for decontaminating water.

Environmental regulations strictly mandate maximum levels of volatile organic compounds (VOCs) that may be present in groundwater flowing beneath an industrial or storage facility, and in water effluent from an industrial process.

Methods proposed for addressing this problem have included such techniques as air stripping, vaporization of an entire process-flow with selective recondensation of water, hydrocarbon contaminant adsorbtion and chemical treatment.

SUMMARY OF THE INVENTION

According to one aspect of the invention, a method for decontaminating water which is contaminated by small concentrations of dissolved volatile organic compounds comprises the process of introducing a flow of the water to an air stripping stage, including directing the water through a packed column and directing a flow of air through the column to air-strip the organic molecules from the contaminated water, releasing the thus decontaminated water substantially free of the compounds to the environment, pretreating the organic compounds-carrying air in the substantial absence of water particles by a preheater means, passing the heated air through a catalytic stage that oxidizes the organic compounds, and releasing the gaseous effluent from the catalytic stage to the atmosphere substantially free of the organic contaminants.

The invention in particular comprehends treatment of effluents in which the dissolved volatile organic compounds are present in concentrations in the range 0.01 to 100 ppm, and, typically, are from the group of toluene, benzene and xylene.

In preferred embodiments, the hot gases from the catalytic stage are employed in a heat exchanger to preheat the air carrying the organic compound before the air enters the catalytic stage.

Preferably, also, the air is caused to flow countercurrent to the flow of water in the packed column.

According to another aspect of the invention, a system for decontaminating water which is contaminated by the presence of small concentrations of dissolved volatile organic compounds comprises a packed tower, an inlet water conduit and pump for delivering the contaminated water into the packed tower, a blower for causing a flow of air through the packed tower for stripping the organic compounds from the water, a water outlet conduit for releasing the water substantially free of the compounds to the environment, a heater for preheating the air that carries the organic compounds, a catalytic stage adapted to oxidize the organic compounds as the preheated air flows therethrough, and an outlet for releasing the gaseous effluent from the catalytic stage to the atmosphere substantially free of the organic contaminants.

In preferred embodiments of this aspect of the invention, the system further comprises a heat exchanger adapted for transfer of heat from the hot gases following the catalytic stage to the air carrying the organic compounds before the contaminated air reaches the catalytic stage. The system is adapted to handle effluents in which the compounds are present in concentrations in the range of about 0.01 to 100 ppm, and, typically, are present in a concentration of about 5 ppm. The compounds are from the group of toluene, benzene and xylene.

According to a further aspect of the invention, a converter for use in decontaminating groundwater containing dissolved volatile organic compounds as described above comprises conduit means for conducting a flow of air carrying the compounds from the air stripper to the converter, a heater means for receiving and preheating the organic compounds-carrying air, a catalytic stage adapted to oxidize organic compounds as the heated air flows therethrough, and an outlet means for delivering gaseous effluent from the catalytic stage into the atmosphere, substantially free of the organic contaminants.

In preferred embodiments of this aspect of the invention, the preheater means comprises a heat exchanger adapted to transfer heat from the gaseous effluent of the catalytic stage into the organic compounds-carrying air.

According to one specific aspect in the invention, a system for decontaminating groundwater contaminated by the presence of about 0.01 to 100 ppm of volatile dissolved organic compounds comprises a pump adapted for pumping water from a well or other site of water collection to remove contaminated groundwater and create a cone of depression in the water table about the pump site to restrict flow of groundwater containing the contaminants away from the pump site, a first conduit for conducting groundwater from the pump, a packed tower stage and a converter stage. The packed tower stage comprises a tower containing a column of packing, water inlet and distribution means for receiving contaminated groundwater from the first conduit and dispersing the water to flow through the packing, an open support grid for supporting the column and adapted for flow of water and air therethrough, a blower for causing flow of air through the column for stripping the volatile organic compounds from the contaminated water, a water outlet conduit for delivering the water substantially free of the contaminants to the environment, a second conduit for delivering a flow of air bearing the organic compounds out of the tower, and mist eliminator means for removing particles of water from the flow of air entering the second conduit. The converter stage comprises inlet means for receiving a flow of the organic contaminants-carrying air from the second conduit, a heater means for preheating the air flow from the second conduit, a catalytic device adapted to oxidize the organic compounds as the preheated air flows therethrough, the heater means comprising a heat exchanger for transfer of heat from the hot gases following the catalytic device to the organic contaminants-carrying air before the contaminated air reaches the catalytic device, a third conduit for conducting hot gases from the catalytic device into the heat exchanger, and an outlet for releasing the gaseous effluent from the heat exchanger to the atmosphere, substantially free of organic contaminants.

The invention thus provides a system and method for effective and cost efficient removal of small concentrations of VOCs, e.g., 0.01 to 100 ppm, from water, e.g., groundwater, and returning to the environment both water and gaseous effluent that are substantially free of organic contaminants. There is further provided a retrofit converter for use with an existing air stripper for removing small concentrations of organic compounds from the gaseous effluent of the stripper.

Other features and advantages of the invention will be apparent from the following description of a preferred embodiment and from the claims.

PREFERRED EMBODIMENT

We first briefly describe the drawings:

Drawings

Figure 1:
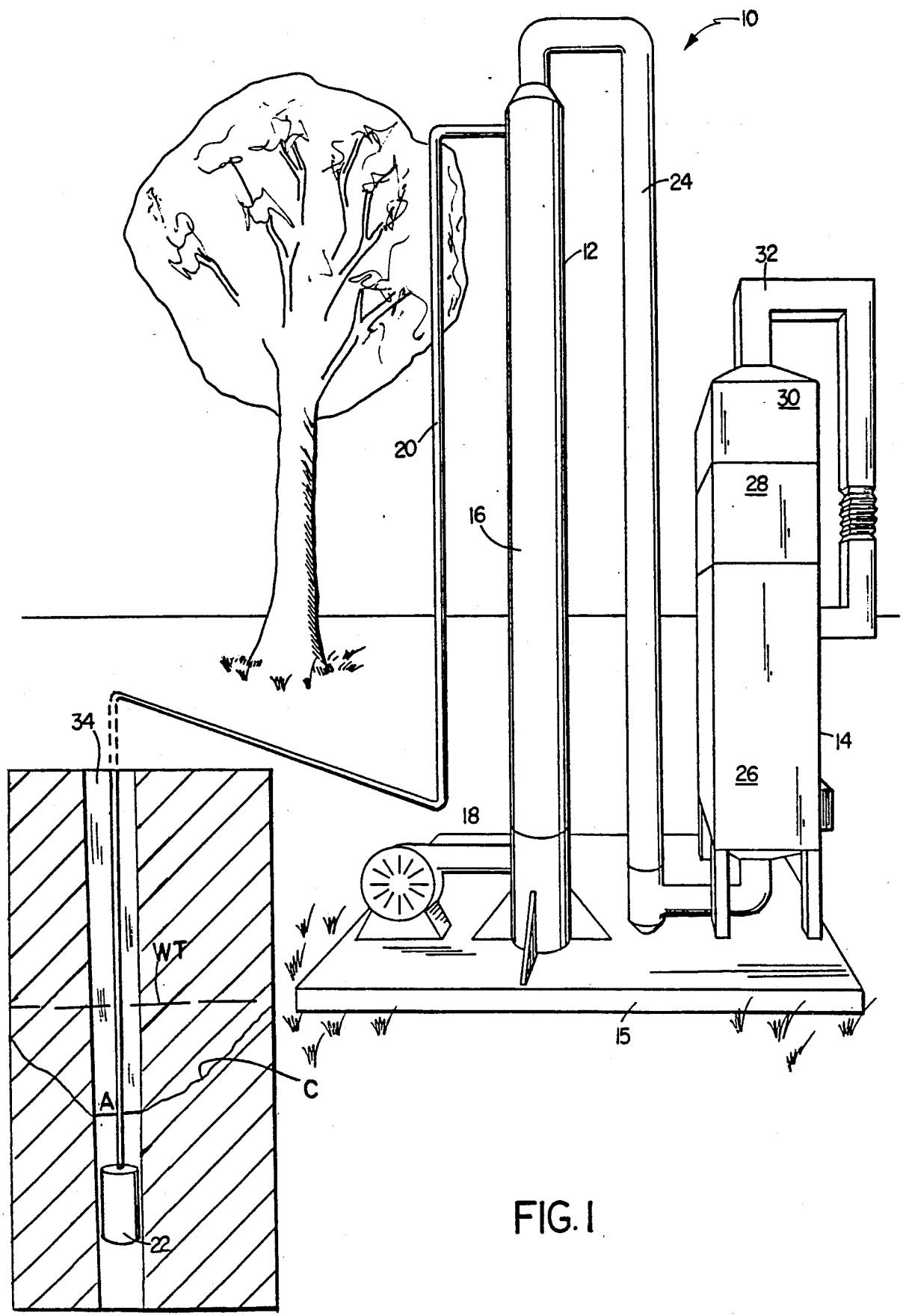
FIG. 1 is a perspective view of a system of the invention in place for removing low concentrations of VOCs from, e.g., contaminated groundwater.

Referring to FIG. 1, a system 10 of the invention is seen in place, e.g., in the vicinity of a fuel or chemical storage facility or filling station, for protection of the environment by removal of small concentrations, e.g., 0.01 to 100 ppm, and typically about 5 ppm, volatile organic compounds (VOCs), e.g., toluene, benzene, xylene, ethyl benzene, halogenated hydrocarbons, etc., from groundwater. The system consists of a stripper stage 12 and a catalytic stage 14 disposed on a concrete pad 15.

Briefly, the stripper stage consists of a packed tower 16, an air blower 18 for delivering a flow of air into the lower portion of the tower, and a conduit 20 connected to a pump 22 for delivery of VOC-contaminated water into the upper portion of the tower. Duct 24 connects the stripper section 12 with the catalytic section 14, extending from the top of tower 16 to the base of heat exchanger 26. The catalytic stage 14 briefly consists of the heat exchanger, preheater 28 disposed atop the exchanger and a catalytic converter 30. Duct 32 connects the outlet of converter 30 to exchanger 26.

For removing small concentrations of VOC contaminants from groundwater in a manner that is effective and also cost efficient, a well 34 is provided to a depth below the level, WT, of the water table. Pump 22, e.g., a ½ horsepower submersible pump, suspended in the well at a depth of 30 feet, below the level of the water table, pumps contaminated groundwater from the well, via conduit 20, into the upper portion 35 of packed tower 16 at a rate in the range of about 3 to 20 gallons per minute (gpm), typically at a rate of about 10 gpm. (As shown, removal of groundwater from the well creates a cone of depression, C, in the water table about the well. VOCs, being lighter than water, float on top of the groundwater, and the cone of depression causes the VOCs to concentrate in the area A of the apex of the cone, at the pump site.)

Figure 2:
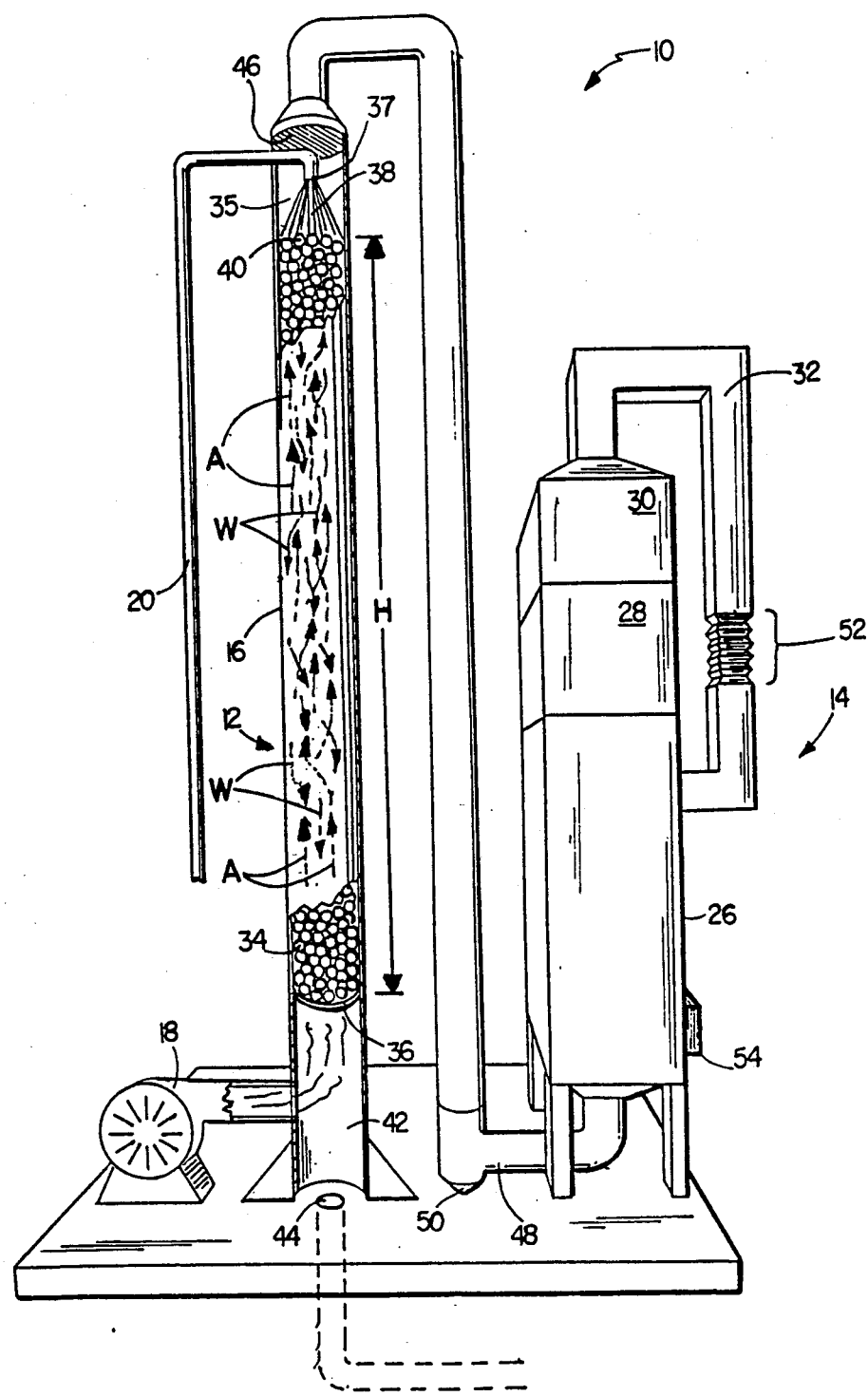
FIG. 2 is a similar view showing the system of FIG. 1, with the packed tower in cross-sectional view.

Referring to FIG. 2, the packed tower 16 is typically of fiberglass-reinforced plastic, containing a column of packing 34, e.g., Jaeger Tripack, polypropylene spheroids 2 inches in diameter, of packed height, H, e.g., about 14 feet, resting on a packing grate 36. The end of conduit 20 carrying VOC-contaminated water terminates within the tower, above the packing, in a spray head 37. The spray head delivers VOC-contaminated water in a 90° cone 38 onto the entire exposed surface 40 of the packing. Blower 18, e.g., a centrifugal fan manufactured by American Fan Co. of Fairfield, Ohio, having a capacity of 1,100 standard cubic feet per minute, delivers a flow of air, e.g., 100 cubic feet per minute is typical, into the lower portion 42 of the packed tower, below grate 36. The air (upwardly-directed arrows, A) flowing upwardly through the packing in countercurrent flow to the water (downwardly-directed arrows, W) flowing downwardly strips the VOCs from the water in a manner known in the art, whereby the water passing through packing grate 36 into the lower portion 42 of the tower is free of contamination, and passes via sump 44 from the tower, usually to be returned to the environment. The VOC-bearing flow of air emerges from the upper surface 40 of the column of packing into tower upper portion 35, and passes through mist eliminator 46, e.g., a plastic mesh, to remove moisture from the flow entering duct 24, e.g., a 6 inch diameter PVC (polyvinyl chloride) pipe. The flow of VOC-bearing air travels vertically downward to a U-bend 48, where there is provided a trap 50 for collection of further condensate from the air flow.

The VOC-bearing, essentially dry air from duct 24 enters the catalytic stage, e.g., in the embodiment of FIGS. 1 and 2, typically about 5 to 7 feet tall and 24 inches square, via the base of heat exchanger 26, a fixed plate, air-to-air heat exchanger, 49 inches high, 15 inches wide and 19 inches deep, having membranes of 18 gauge, 304 stainless steel with welded end and primary seals, as manufactured by Exothermics-Eclipse, Inc., of Toledo, Oh., to provide side-by-side passages for countercurrent air flow. The relatively cool, VOC-bearing air from the stripper stage flows upwardly through the heat exchanger, and is heated by hot gases flowing countercurrently from duct 32, through the exchanger, as described below. The warmed, VOC-bearing air flowing upwardly from the heat exchanger typically is not at a temperature sufficient for efficient reaction within the catalytic converter, e.g., about 600° to 700° F. is required. The heated VOC-carrying air is passed through preheater 28, containing, e.g., six electric resistive heater elements, e.g., 20 kilowatt, 220 volt, 3 phase, encased in stainless steel U-tubes (not shown), for further heating of the VOC-bearing air. (The heat exchanger membranes and the U-tubes are of stainless steel for extended life and reduced maintenance. It is also important that the air flow be as dry as is practical in order to minimize mineral clogging and scale of the heat exchanger, and to extend the useful life of the catalytic converter section. In instances where the VOCs carried by the air flow produce acid gases upon combustion, e.g., chlorinated hydrocarbons, the surfaces of the ducting and heat exchanger upstream of the catalytic stage may be coated, e.g., with polyvinylidene fluoride (KYNAR*, from Pennwalt Corporation of Philadelphia, Pa.), for additional protection. The U-tubes and the heat exchanger panels are also replaceable in the field for ease of maintenance and reduce downtime.)

The heated, VOC-carrying air flows upwardly from the preheater into the catalytic converter 30, containing the catalyst, e.g., a steel screen rolled into a cylinder, coated with platinum, 3.25 inches high and 12 inches in diameter, as manufactured by Johnson-Matthey, through which the VOC-carrying air is caused to flow for conversion of the VOC molecules into carbon dioxide and water. The catalyst is encased in insulation, e.g., Intrim TM nonasbestos wrapping, manufactured by 3M of Minneapolis, Minn., to contain the heat of reaction and to prevent the VOC-carrying air from flowing around the catalyst. The hot air, now essentially free of VOCs, flows through duct 32 into heat exchanger 26 for transfer of heat from the hot, now clean air into the contaminated air from the stripper stage. (Bellows section 52 in duct 32 allows the duct to adjust for thermal expansion.) The clean air flows from the heat exchanger 26 via outlet port 54. (Additional ducting may be attached to port 54 to discharge the warm exhaust gases at a position and condition in compliance with local regulations.)

Figure 3:
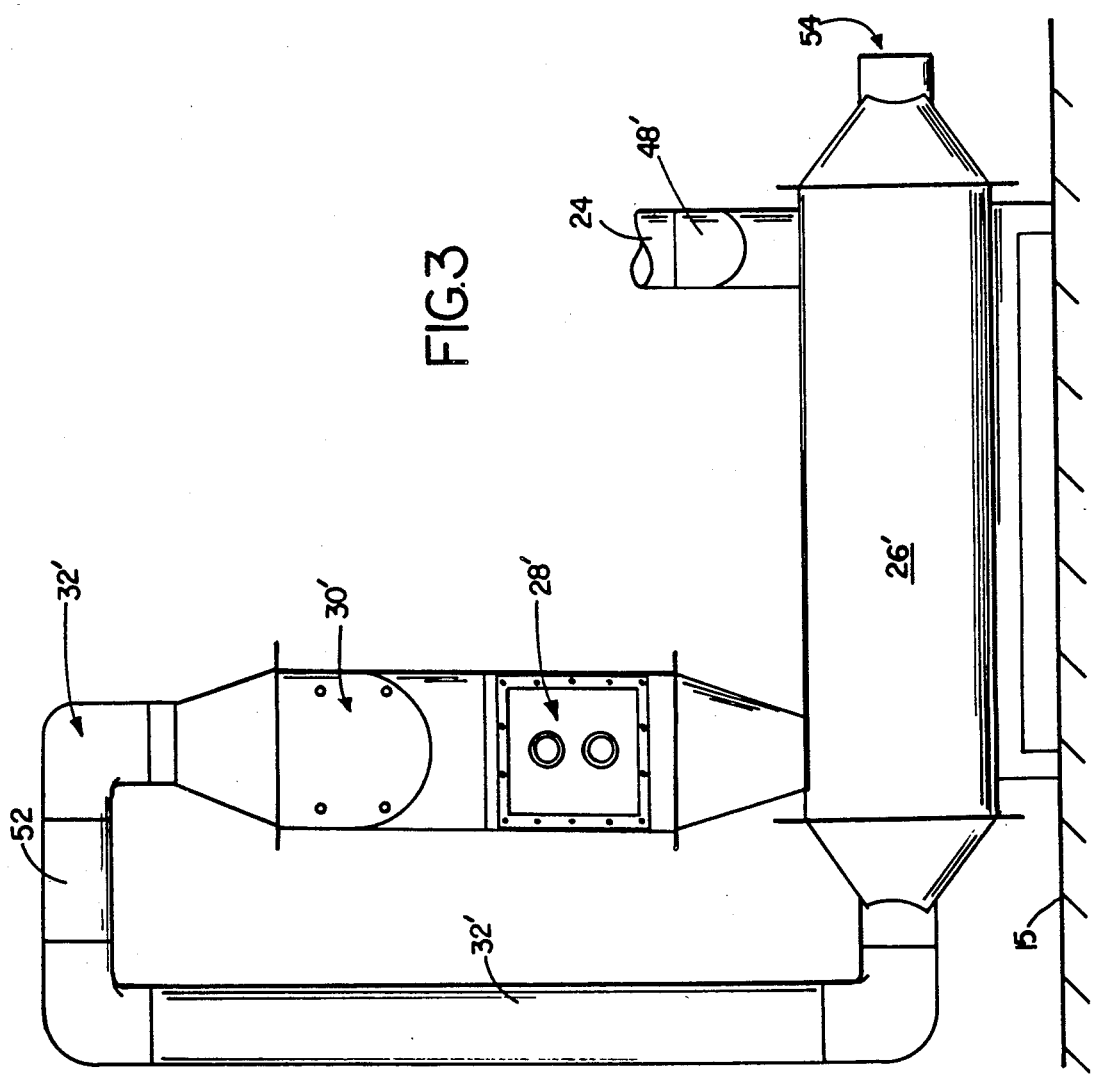
FIG. 3 is a side view of another embodiment of a catalytic stage of the invention.

Other embodiments are within the following claims. For example, referring to FIG. 3, other arrangements of catalytic stage components may be employed. In FIG. 3, the heat exchanger 26' of catalytic stage 14' consists of an elongated tank disposed for horizontal cross flow of VOC-carrying air in duct 24' from the stripper stage and hot exhaust gas in duct 32'. Preheater 28' is mounted above heat exchanger 26'; the arrangement of catalytic converter 30' and duct 32' are as described above, with hot gas from the catalytic converter passed through heat exchanger 26' to be vented to the environment from duct 54'. Other arrangements are also contemplated, e.g., catalytic stage may be mounted on top of stripper stage 12, and the catalytic stage, whether mounted atop or adjacent the stripper stage, may be provided for retrofit to an existing stripper system. All exposed metal surfaces may be wrapped with, e.g., a ceramic fiber insulation to minimize heat losses. The system of the invention may be employed for removing VOCs from an effluent process stream delivered into the packed tower via conduit 20.

The dimension and rates of flow mentioned herein are, of course, provided solely for the purpose of example, and other dimensions and rates may be employed. For example, the tower may be 4 feet in diameter, and the packed column may be up to 27 feet high for improved VOC removal efficiency. Water from sump 44 may be recycled to the top of the tower for recirculation, e.g., for further removal of contaminants, or to reduce the concentration of VOCs in the water to be treated.

What is claimed is:

1. A decontamination system installed at an outdoor contaminated site at which organic contaminants have entered the ground and contaminate the ground water, said system comprising air stripper means constructed to receive water from said outdoor site containing said organic contaminants and constructed to produce therefrom an air stream carrying organic contaminants and an effluent water stream substantially free of said organic contaminants, and decontamination apparatus having an inlet to receive said air stream carrying site-derived organic contaminants, preheating means, comprising (a) a heat exchanger and (b) a heater arranged to preheat said air stream, an oxidizing catalytic converter having a predetermined minimum operating temperature for efficient operation and arranged to receive the preheated air stream from said preheater means and constructed to oxidize said site-derived organic contaminants carried by said air stream to produce an effluent air stream substantially free of said organic contaminants, and ducting directing the effluent air stream from said catalytic converter through said heat exchanger, and thence to the atmosphere, said heat exchanger effective to cause the air stream, flowing from said catalytic converter, to transfer its heat to the incoming air stream that carries site-derived contaminants, said heater of said preheating means constructed and arranged to cooperate with said heat exchanger to elevate the temperature of said preheated air stream reaching said catalytic converter to said minimum operating temperature, whereby a gaseous effluent substantially free of said site-derived organic contaminants is released to the atmosphere at said outdoor site while an effluent stream of water decontaminated of said site-derived organic contaminants is produced.

2. The decontamination system of claim 1 wherein the active material of said catalytic converter is precious metal, said catalytic converter having a minimum operating temperature of between about 600° and 700° F.

3. The decontamination system of claim 1 wherein said heater is disposed to receive said air stream in series with and downstream of said heat exchanger.

4. The apparatus of claim 3 wherein said heat exchanger is mounted on supports and lies below said heater, catalytic converter and associated ducting, the aforesaid components being assembled as a unit and installed at the contaminated outdoor site.

5. The apparatus of claim 4 wherein said heat exchanger is constructed and arranged to define substantially horizontal flow paths for the hot effluent air stream from said catalytic converter and the incoming air stream carrying site-derived contaminants.

6. The apparatus of claim 5 wherein said heat exchanger is elongated and has at one end a connection to receive the hot effluent air stream from said catalytic converter and at the opposite end an outlet for said gases cooled as a result of passing through said heat exchanger, for release to the atmosphere, and connections in the vicinity of the top of the heat exchanger at one end for receiving the inlet flow of air carrying site-derived organic contaminants and at the other end an outlet for said air stream partially preheated as a result of passing through said heat exchanger, for flow to said heater.

7. The apparatus of claim 1 wherein said heater is an electric heater containing electric resistance elements.

8. A decontamination system installed at an outdoor contaminated site at which organic contaminants have entered the ground and contaminate the ground water, said system comprising air stripper means constructed to receive water from said outdoor site containing said organic contaminants and constructed to produce therefrom an air stream carrying organic contaminants and an effluent water stream substantially free of said organic contaminants and decontamination apparatus having an inlet to receive said air stream carrying site-derived organic contaminants, preheating means, comprising (a) a heat exchanger and (b) a heater arranged to preheat said air stream, an oxidizing catalytic converter having a predetermined minimum operating temperature for efficient operation and arranged to receive the preheated air stream from said preheater means and constructed to oxidize said site-derived organic contaminants carried by said air stream to produce an effluent air stream substantially free of said organic contaminants, and ducting directing the effluent air stream from said catalytic converter through said heat exchanger, and thence to the atmosphere, said heat exchanger effective to cause the air stream, flowing from said catalytic converter, to transfer its heat to the incoming air stream that carries site-derived contaminants, said heater of said preheating means constructed and arranged to cooperate with said heat exchanger to elevate the temperature of said preheated air stream reaching said catalytic converter to said minimum operating temperature, the active material of said catalytic converter being precious metal, said catalytic converter having a minimum operating temperature of between about 600° and 700° F., and said heater being an electric heater containing electric resistance elements, whereby a gaseous effluent substantially free of said site-derived organic contaminants is released to the atmosphere at said outdoor site while an effluent stream of water decontaminated of said site-derived organic contaminants is produced.

9. A method of decontaminating an outdoor contaminated site at which organic contaminants have entered the ground and contaminate the ground water, comprising the steps of producing from the site a stream of water containing said organic contaminants and, by air stripping, producing therefrom an airstream carrying organic contaminants and an effluent water stream substantially free of said organic contaminants and treating said air stream with a decontamination apparatus having an inlet to receive said air stream carrying site-derived organic contaminants, preheating means comprising (a) a heat exchanger and (b) a heater, arranged to preheat said air stream, an oxidizing catalytic converter having a predetermined minimum operating temperature for efficient operation and arranged to receive the preheated air stream from said preheater means and constructed to oxidize said site-derived organic contaminants carried by said air stream to produce an effluent airstream substantially free of said organic contaminants and ducting directing the effluent air stream from said catalytic converter through said heat exchanger, and thence to the atmosphere, said heat exchanger effective to cause the air stream, flowing from said catalytic converter, to transfer its heat to the incoming air stream that carries site-derived contaminants, said heater of said preheating means constructed and arranged to cooperate with said heat exchanger to elevate the temperature of said preheated air stream reaching said catalytic converter to said minimum operating temperature, whereby a gaseous effluent substantially free of said site-derived organic contaminants is released to the atmosphere at said outdoor site while an effluent stream of water decontaminated of said site-derived organic contaminants is produced.

10. A method of decontaminating an outdoor contaminated site at which organic contaminants have entered the ground and contaminate the ground water, comprising the steps of producing from the site a stream of water containing said organic contaminants and, by air stripping, producing therefrom an airstream carrying organic contaminants and an effluent water stream substantially free of said organic contaminants and treating said air stream with a decontamination apparatus having an inlet to receive said air stream carrying site-derived organic contaminants, preheating means comprising (a) a heat exchanger and (b) a heater arranged to preheat said air stream, an oxidizing catalytic converter having a predetermined minimum operating temperature for efficient operation and arranged to receive the preheated air stream from said preheater means and constructed to oxidize site-derived organic contaminants carried by said air stream to produce an effluent airstream substantially free of said organic contaminants, and ducting directing the effluent air stream from said catalytic converter through said heat exchanger, and thence to the atmosphere, said heat exchanger effective to cause the air stream, flowing from said catalytic converter, to transfer its heat to the incoming air stream that carries site-derived contaminants, said heater of said preheating means constructed and arranged to cooperate with said heat exchanger to elevate the temperature of said preheated air stream reaching said catalytic converter to said minimum operating temperature, the active material of said catalytic converter being precious metal, said catalytic converter having a minimum operating temperature of between about 600° and 700° F., and said heater being an electric heater containing electric resistance elements, whereby a gaseous effluent substantially free of said site-derived organic contaminants is released to the atmosphere at said outdoor site while an effluent stream of water decontaminated of said site-derived organic contaminants is produced.

* * * * *